(12) United States Patent
Chillar et al.

(10) Patent No.: US 11,101,050 B2
(45) Date of Patent: Aug. 24, 2021

(54) SYSTEMS AND METHODS TO EVALUATE AND REDUCE OUTAGES IN POWER PLANTS

(71) Applicant: General Electric Company, Schenectady, NY (US)

(72) Inventors: Rahul Jaikaran Chillar, Atlanta, GA (US); John Jacob Patanian, Roswell, GA (US); Christopher Schreiner, Chicago, IL (US); Sanjeev S. Heda, Kennesaw, GA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 666 days.

(21) Appl. No.: 15/408,492

(22) Filed: Jan. 18, 2017

(65) Prior Publication Data

US 2018/0204095 A1    Jul. 19, 2018

(51) Int. Cl.
*G21D 3/04* (2006.01)
*G21C 17/00* (2006.01)
(Continued)

(52) U.S. Cl.
CPC .............. *G21D 3/04* (2013.01); *G05B 23/02* (2013.01); *G06F 11/07* (2013.01)

(58) Field of Classification Search
CPC ........ G21D 3/04; G05B 13/048; G05B 23/02; F01K 13/02; F02C 7/26; G06F 30/17; G06F 11/07
(Continued)

(56) References Cited

U.S. PATENT DOCUMENTS

2003/0195675 A1* 10/2003 Felke ................. G05B 23/0278
                                                        701/29.3
2010/0088538 A1*  4/2010 Kolbet ................... G06N 7/005
                                                        714/1

(Continued)

OTHER PUBLICATIONS

"GE Introduces Digital Power Plant for Steam to Enhance Efficiency and Reduce Emissions of Coal-Fired Plants," http://www.genewsroom.com/press-releases/ge-introduces-digital-power, Jun. 2016. (7 pages).

(Continued)

*Primary Examiner* — Michael P Nghiem
(74) *Attorney, Agent, or Firm* — Armstrong Teasdale LLP

(57) ABSTRACT

A process of evaluating and reducing outages in a power plant comprises acquiring analytical data for a power plant and its components, acquiring failure modes regarding power plants, identifying and categorizing the acquired failure modes in association with the components of the power plant at various levels, evaluating and ranking the significance of each of the identified failure modes based on the analytical data, evaluating and ranking the analytical coverages of the identified failure modes based on the analytical data, and ranking and evaluating the components based on the significance and the analytical coverages of their associated failure modes. Based upon the determined significance and analytical coverages of identified failure modes, a power plant owner is able to evaluate the performance of a power plant at various levels, identify analytical gaps in reducing outages of the power plant, and enhance the performance of the power plant.

13 Claims, 8 Drawing Sheets

(51) Int. Cl.
  *G06F 11/30* (2006.01)
  *G06F 11/07* (2006.01)
  *G05B 23/02* (2006.01)
(58) Field of Classification Search
  USPC .................................................. 702/116, 185
  See application file for complete search history.

(56) References Cited

U.S. PATENT DOCUMENTS

| 2015/0184550 | A1  | 7/2015 | Wichmann et al. |
| 2015/0185716 | A1  | 7/2015 | Wichmann et al. |
| 2017/0186249 | A1* | 6/2017 | Bandy ................. G07C 5/0816 |
| 2018/0060832 | A1* | 3/2018 | Korsedal, IV ...... G01M 99/005 |
| 2018/0165384 | A1* | 6/2018 | Gandhi .............. G05B 23/0254 |

OTHER PUBLICATIONS

Powering 2016, "The Digital Transformation of Electricity," GE Power Digital Solutions Product Catalog www.ge.com/digital/power (31 pages).

Electricity 2.0: "Why Asia's Utilities Are Getting Ready to Download the Digital Power Plant" http://www.gereports.com/when-hardware-met-software-asias-utilities-are-getting-ready-to-download-ges-digital-power-plant, Sep. 19, 2016 (3 pages). . . .

Ross, Pei Power Engineering International, "GE unveils transformational Digital Power Plant," Sep. 2015 (3 pages).

Trabish, "How digital power plant tech can help utilities get the most from their assets", http://www.utilitydive.com/news/digital-power-plant-tech-can-help-utilities, Oct. 2015 (8 pages).

* cited by examiner

SYSTEMS AND METHODS TO EVALUATE AND REDUCE OUTAGES IN POWER PLANTS

FIELD OF THE INVENTION

The field of invention is scheduling maintenance and inspection of complex industrial systems and, particularly, to scheduling maintenance and inspections of power generation facilities.

BACKGROUND OF THE INVENTION

A power generation facility or other complex industrial system has many components that require periodic maintenance. While some of the components may be maintained and repaired during operation of the facility or system, other components are repaired while some or all of the facility or system is shutdown. Scheduling maintenance of the components requires knowing when the components need to be maintained or replaced, and identifying those components that require a shutdown for maintenance or replacement. Shutdowns must be periodically scheduled for those components requiring a shutdown.

A conventional practice is to schedule maintenance and repair of components based on prescribed periods for maintenance and replacement at the components end of life. These prescribed periods tend to be conservative for most components, and are shorter than the period between maintenance and repairs actually needed by most components. Due to the conservative nature of the prescribed periods of repair, the components of a facility or system are repaired or maintained more often than is needed for proper operation of the components. In contrast, components operating in harsh environments often require repair and replacement sooner than set by the prescribed periods for maintenance and replacement. For components operating in harsh environments, the prescribed maintenance schedule is not frequent enough to prevent failures of the component.

Prescribed schedules are not the only techniques used to determine when to repair, inspect and maintain components. Sensors monitoring a power generation facility or other complex industrial system provide information, e.g., data, on the health of components in the facility and system. Information from the sensors is used to indicate when a component needs maintenance, repair or replacement. This information is used to determine a schedule for maintenance, repair or replacement or to supplement or adjust such schedules primarily based on the prescribed periods repair and replacement for components. Sensors may not monitor all components or all operational conditions of the components that they do monitor. There are often components and operational conditions that are not fully monitored by sensors. Similarly, certain failure modes of components may not be reliably detected by sensors monitoring the components.

Difficulties and shortcomings with conventional approaches to scheduling maintenance and repair of components in power generation facilities and other complex industrial systems result in high costs and excessive shutdown time due to performing too frequently maintenance, repair and replacement of components; inadequate prediction of poor performance and failures of components, insufficient knowledge of the operation of the components, and insufficient knowledge of the extend of coverage by sensors of the components and their failure modes.

SUMMARY OF THE INVENTION

To overcome the above identified difficulties and shortcomings with conventional approaches to scheduling maintenance and repair of components in a complex industrial system ("asset components"), methods and systems have been invented and are disclosed here to evaluate and prioritize the significance and detectability of failure modes associated with asset components by mapping analytical data derived from these components to these failure modes. The method may be embodied as a process for evaluating and reducing outages in a power plant by: acquiring analytical data for the power plant and its components, acquiring data on failure modes regarding power plants; identifying and categorizing the acquired failure modes, evaluating and ranking the significance or severity of each of the identified failure modes, evaluating and ranking based on ability, of an analytic monitoring an asset component correlated to a selected failure mode, to detect or sense failures in the analytical coverages of the identified failure modes, and ranking and evaluating the components based on the significance and the analytical coverages of their associated failure modes. The result of the method may be reported as an amount or percentage of coverage of the identified failure modes in a power plant.

In addition, based upon the determined significance and analytical coverages of identified failure modes, an asset owner is able to evaluate the performance of an asset at various levels and identify analytical gaps in reducing failures of the asset, and then the asset owner can enhance the performance of the asset by strategically investing on the identified analytical gaps. In some example embodiments, when it is determined that certain components are associated with failure modes having important impact and low analytical coverages, new sensors may be added into these components, and new analytics may also be developed based on data streams from the new sensors.

A novel method has been conceived and is disclosed herein for evaluating a power generation facility or other complex industrial system (collectively the system) including: acquiring analytical data, from sensors monitoring the system, regarding the operation of the system and the components of the system; identifying failure modes of the components; categorizing the acquired failure modes, ranking the significance of each of the identified failure modes, evaluating and ranking the analytical coverages by the sensors of the identified failure modes, and ranking and evaluating the components based on the significance and the analytical coverages of their associated failure modes.

BRIEF DESCRIPTION OF THE DRAWINGS

The accompanying drawings facilitate an understanding of the various preferred embodiments of this invention. In such drawings.

DETAILED DESCRIPTION OF EXEMPLARY EMBODIMENTS

Figure 1:
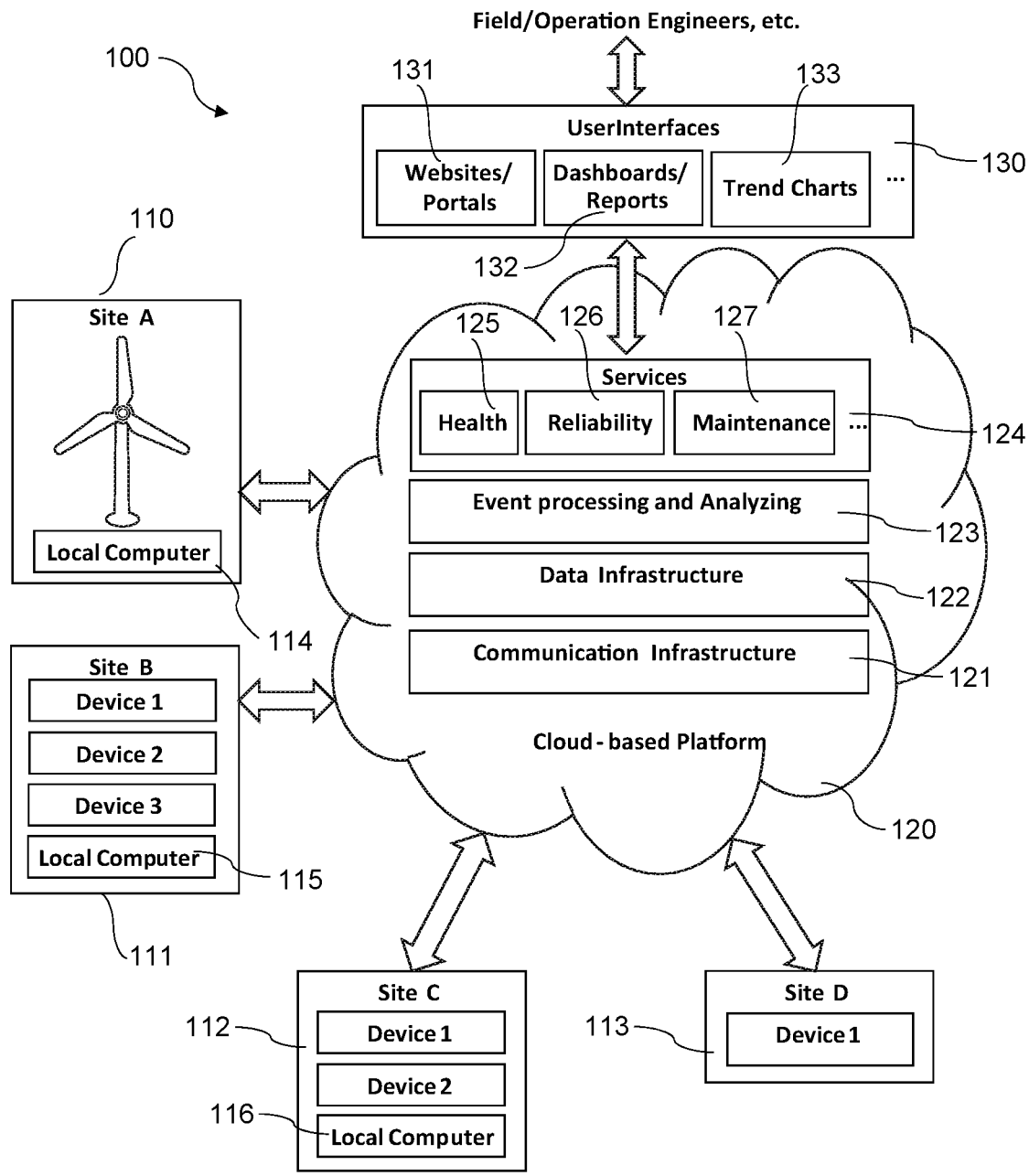
FIG. 1 shows the system architecture of an example Asset Performance Management (APM) system.

FIG. 1 illustrates a system architecture of an Asset Performance Management (APM) system 100. Powered by an Industrial Internet platform. The Asset Performance Management (APM) system 100 is configured to collect and analyze information from systems, predict when components are expected to failure in a system, determine schedules for maintenance, repair and replacement of components in the system based on the predictions, and determine coverage by sensors of the system. The APM system may provide a unified view of systems and their components, allow the operators of the systems to monitor and analyze the performance of the components and the overall system, and faster and more informed decisions regarding the performance of a system and its components.

The APM 100, which may be referred to as an Industrial Internet (IoT), provides a platform for performance management of power general facilities and other complex industrial systems (collectively "systems"). As an example of a suitable platform of the APM 100, General Electric's (GE's) Predix platform is a cloud-based platform that monitors systems by collecting information, e.g., data from the systems and the sensors that monitor the components of the systems. The APM may be used to apply various computing techniques, such as machine learning, big data, and machine-to-machine communication to collect and analyze data from a system. The APM provides industrial operators with a common computing architecture that links systems, collects data from the systems and applies analytics to the collected data.

Operational efficiency of a system can be improved through investing in new sensors and developing analytics to monitor and detect events in data collected from the sensors. Determining which components and potential failures are not adequately monitored by sensors can be accomplished with the APM system 100. The APM may be embodied to identify modes of failure of the system, rank the identified modes by their severity on the operation of the system, determine the extent to which sensors are able to predict the identified failures, and determine the extent to which the APM can predict and thus avert failures in the system and identify potential failures which are not readily predicted.

The APM system 100 draws analytical data from devices to create a sophisticated framework for how and when to do maintenance, in turn improving operational efficiency and reducing unplanned downtime of the devices. The APM system 100 serves at least two main purposes: to predict and warn potential failures of an asset, and to help operators manage the operation of the asset.

The APM system 100 supports cloud-based, real-time predicative maintenance, which predicts potential failures of assets and generates warnings or alerts to asset operators before the occurrence of these failures. Asset operators may act on any detected issues or potential failures, or plan to fix certain issues during planned downtime, in order to avoid cost and risk caused by unplanned downtime.

The APM system 100 also assists in managing the operation and lifecycle of assets. The lifecycle of an asset normally comprises planning, acquiring, deploying, maintenance and retiring. It is important to know the latest condition of each component of an asset. The APM system 100 helps asset owners or operators to determine which component is nearing the end of its life, which component needs to be replaced, or which component needs to be upgraded or modernized. This allows for an operation team to develop a strategic plan to manage the lifecycle of each component, or more particularly, to plan for its gradual replacement.

The APM system 100 includes intelligent devices distributed at various sites, for example, a site A 110, a site B 111, a site C 112, and a site D 113 in FIG. 1. At each of these sites, there is at least one device equipped with one or more sensor(s), a processor, a memory, and communication capabilities. Various kinds of sensors may be embedded into these devices, for example, a component of a power plant may comprise a measuring device configured to measure voltages, temperatures, and/or pressures of the component. These intelligent devices can monitor device operation in real time, sample data in real-time at certain rate, and then generate particular data streams regarding the devices, including sensed pressures, temperatures, voltages, etc. A local server or computer, such as local computers 114-116 at sites A-C, may also be deployed in some of the sites to perform local data processing and analysis.

The APM system 100 is powered by a cloud-based communication platform 120, such as GE Predix IoT platform, which is designed specifically for industrial data and analytics crossing industries. The cloud-based communication platform 120, via a data communication infrastructure 121, connects assets like power plants to the Industrial Internet to enable more robust management, analysis and decision-making.

The cloud-based platform 120 comprises a data infrastructure 122 to combine and organize various data streams collected from the intelligent devices. Based on the collected data, an event processing and analyzing module 123 of the APM system performs event processing and analyzing to interpret and act on the data. An analytic engine can be provided in the event processing and analyzing module 123. Different analytics data may be generated by the analytic engine based on sensor-output data from the intelligent devices, such as, but not limited to pressures, temperatures, speeds, concentrations, equipment operating conditions, and other parameters that indicate the condition or operation of a power plant or its components.

In some example embodiments, the analytic engine may be acted as a pattern recognition engine. A pattern may indicate that a particular equipment failure is always associated with particular ranges or particular variances of certain operating parameters. Patterns indicating equipment failures might be learned through observing operation of the equipment over time and then be programed into the analytic engine. The analytic engine may continuously monitor the conditions of a device through detecting variances of particular parameters of the device. Any variances in these parameters or changes in trends of these parameters may be detected. If it is monitored that certain parameters are outside of an expected scope or change in a particular trend, a failure event may be identified and a notification may be generated for further investigations.

In other example embodiments, a digital model may be generated and calibrated to simulate the operation or performance of a power plant, and an analytic engine can then be configured to monitor and predict the operation or performance of the power plant based on the digital model. The digital model may be a physics-based aero-thermodynamic computer model, a regression-fit model, neural-net model, or other suitable computer model of the system represented by the model. For example, the digital model may include algorithms that output simulated performance data of a turbine engine, when the turbine engine is operating in a normal condition. On the other hand, the sensor-output performance data of the turbine engine can provide actual performance data over time. By comparing the sensor-output performance data with the simulated performance data, a difference can be identified by the analytic engine. If the identified difference between the sensor-output data and simulated data exceeds a predetermined threshold, an alert or event report based on the comparison may be generated.

In yet another example embodiment, the digital model may also be used by the analytic engine to predict potential failures of equipment. For example, a plurality of sensors may be used to monitor conditions or operation of a gas turbine and a steam turbine. Based on the data received from these sensors, the digital model may be able to simulate future performance of the turbines, and predict unplanned failures of these turbines, potential power outage or unplanned downtime.

By utilizing analytical data derived by an analytic engine and/or data received from sensors of intelligent assets, various services 124 may be provided by the APM system, including but not limited to, a machine and equipment health service 125, a reliability management service 126, and a maintenance optimization service 127. It is to be understood that the services supported by an APM system are not to be limited to these disclosed services, but may include any kinds of other services powered by the cloud-based platform.

The machine and equipment health service 125 provides a unified view of the intelligent assets anytime and anywhere to reduce the effort it takes to collect and report on asset data. It helps field engineers to understand equipment performance at different levels, and ultimately to make faster and more intelligent decisions. It allows an asset owner or operator to know how the system or each individual component is working, at unit level or system level. For example, a power plant owner can know whether there is a vibration or anomaly detected for the combustion or emission of a turbine. As a result, power plant operators are able to detect and diagnose equipment problems before their occurrence, which allows to reduce unplanned downtime and maintenance cost.

The reliability management service 126 predicts asset issues, so that asset operators can schedule maintenance activities to remedy them and avert costly unplanned downtime. Systems and/or assets are monitored to reduce unplanned downtime and more effectively plan maintenance outages. It also streamlines case and issue management with cross-functional collaboration tools and provides a single basis of asset health for maintenance, operations, engineering, and other functions. Eventually, as more knowledge and experiences with industrial devices are integrated into the system, some of the intelligent assets may be self-aware or operate autonomously.

The maintenance optimization service 127, based on derived analytical data, enables asset owners or operators to rethink how maintenance should be planned and executed. It helps asset owners or operators to develop long-term asset maintenance strategies, through balancing asset life, maintenance costs, and risks.

The above discussed services are provided by the APM system 100 to field or operation engineers via various user interfaces 130. In some example embodiments, through websites or portals 131, or dashboards or reports 132, a field or operation engineer can review status of asserts at different levels to ensure that the assets are maintained in a predictable fashion, and to receive actionable notifications or warnings for impending failures. Moreover, trend charts 133 may be displayed to asset owners or operators for variances in parameters of devices being monitored, which may indicate certain potential failures. These early failure indications and warnings delivered to operators allow for timely action and prevent a major failure down the line, and thus ensure longevity and smooth operation of the assets.

As discussed above, data streams collected by sensors of the intelligent devices are gathered from the devices and organized in the central cloud-based platform 120. Based upon the collected data, analytics are derived to support the services enabled on the central platform 120. In an alternative example embodiment, a local server or a local computer, e.g., the local computer 114, 115, or 116, on a site may analyze certain data locally to detect impending failures of the devices being monitored locally. This enables an operator at that site to immediately review the status of local devices, receive actionable notifications regarding the local devices in a more convenient and efficient manner, and then quickly fix any potential issues or problems before their occurrence. Moreover, a local operator or manger may manage the lifecycle of their local devices based on locally-derived analytical data. In some example embodiments, the data streams detected by intelligent devices will be stored and processed by not only their local sever(s), but also a central server.

Figure 2:
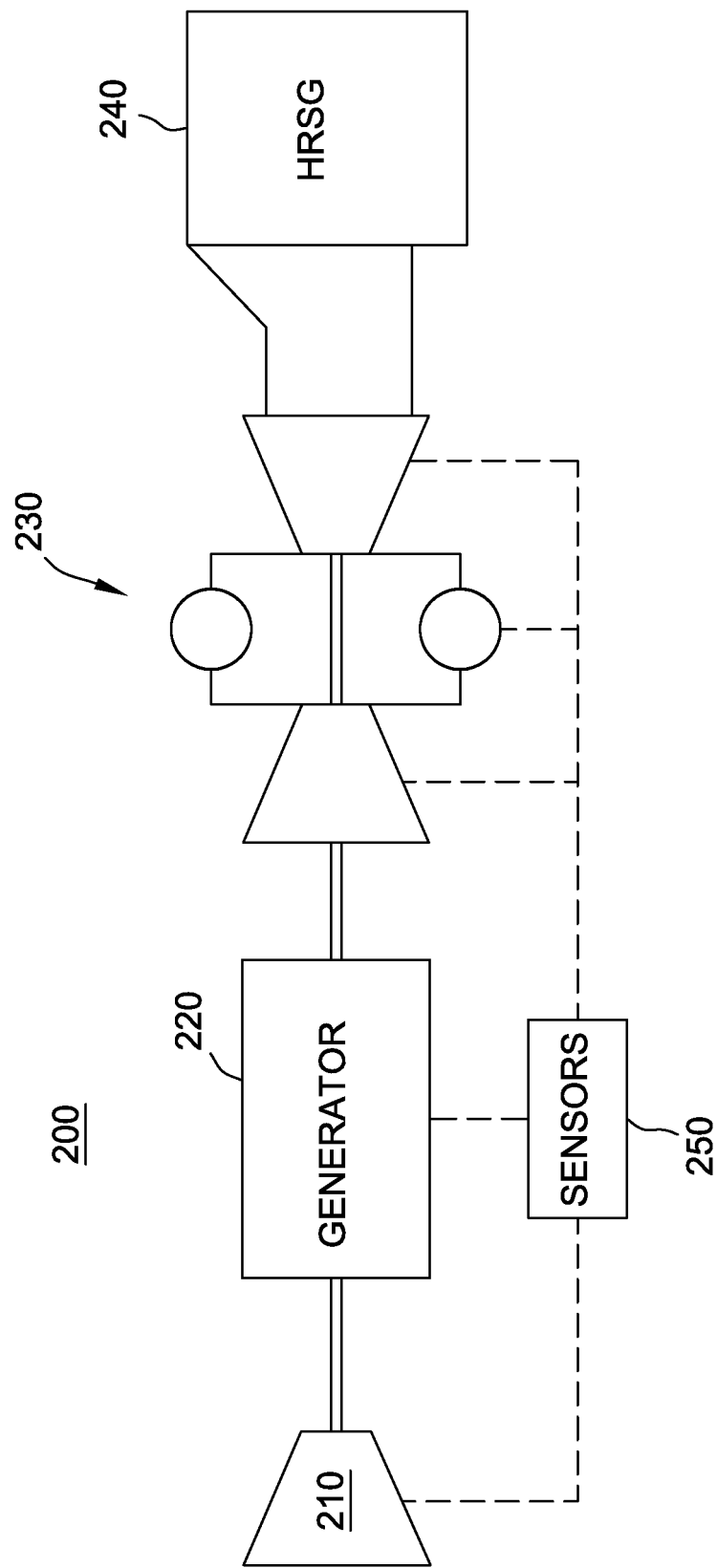
FIG. 2 shows a non-limiting example intelligent power plant equipped with one or more sensor(s) and communication capability.

Referring now to FIG. 2, an example power plant 200 embedded with one or more sensor(s) is illustrated. The power plant 200 and its components are equipped with one or more sensor(s) and communication capability.

By way of example, the power plant 200 is a combined cycle system including a steam turbine 210, a gas turbine 230 and a generator(s) 220 driven by the turbines. Each of the turbines and generators may be monitored by various sensors 250 such as, but not limited to, vibration sensors and temperature sensors. Vibration sensors are mounted at various positions on the casings of the turbines and within the turbines. The vibration sensors detect vibrations of various components of the turbines, such as the vibrations in the rotational shafts, compressor and turbine blades and in the combustor. Vibration sensors on the electrical generator may similar monitor vibrations in the rotational shaft. Data from the vibration sensors may indicate excessive vibrations at certain frequencies that indicate an impending component failure in one of the turbines or generators.

Temperature sensors may also be mounted on the casings and internally within the turbines 210 and 230, generator 220 and heat recovery steam generator 240. The temperature sensors monitor temperatures of components such as the casing of the combustor of the gas turbine 210. gas turbine exhaust temperature, steam inlet and exhaust temperature through the steam turbine 230, and ambient temperature of the atmosphere at the power plant 200. Data from the temperature sensors may be used to detect an overheated condition in a component of the turbines or generators, a combustion can operating hotter than other cans on a gas turbine, a steam temperature outside of a desired temperature range and other temperature related conditions. Other sensors may monitor other conditions of the gas turbine 210, steam turbine 230 and generator 220 such as power output, ambient humidity, power output of the turbines 210 and 230 and generator 220 and other conditions. By virtue of sensors embedded in the power plant 200, an APM system may derive analytical data with predict unplanned failures of power plants, power outage rate and unplanned downtime. By monitoring and connecting various intelligent assets in the power plant 200, the power plants operators are able to improve reliability and maximize uptime of these power plants by virtue of improved availability and extended time between planned downtime.

Figure 3:
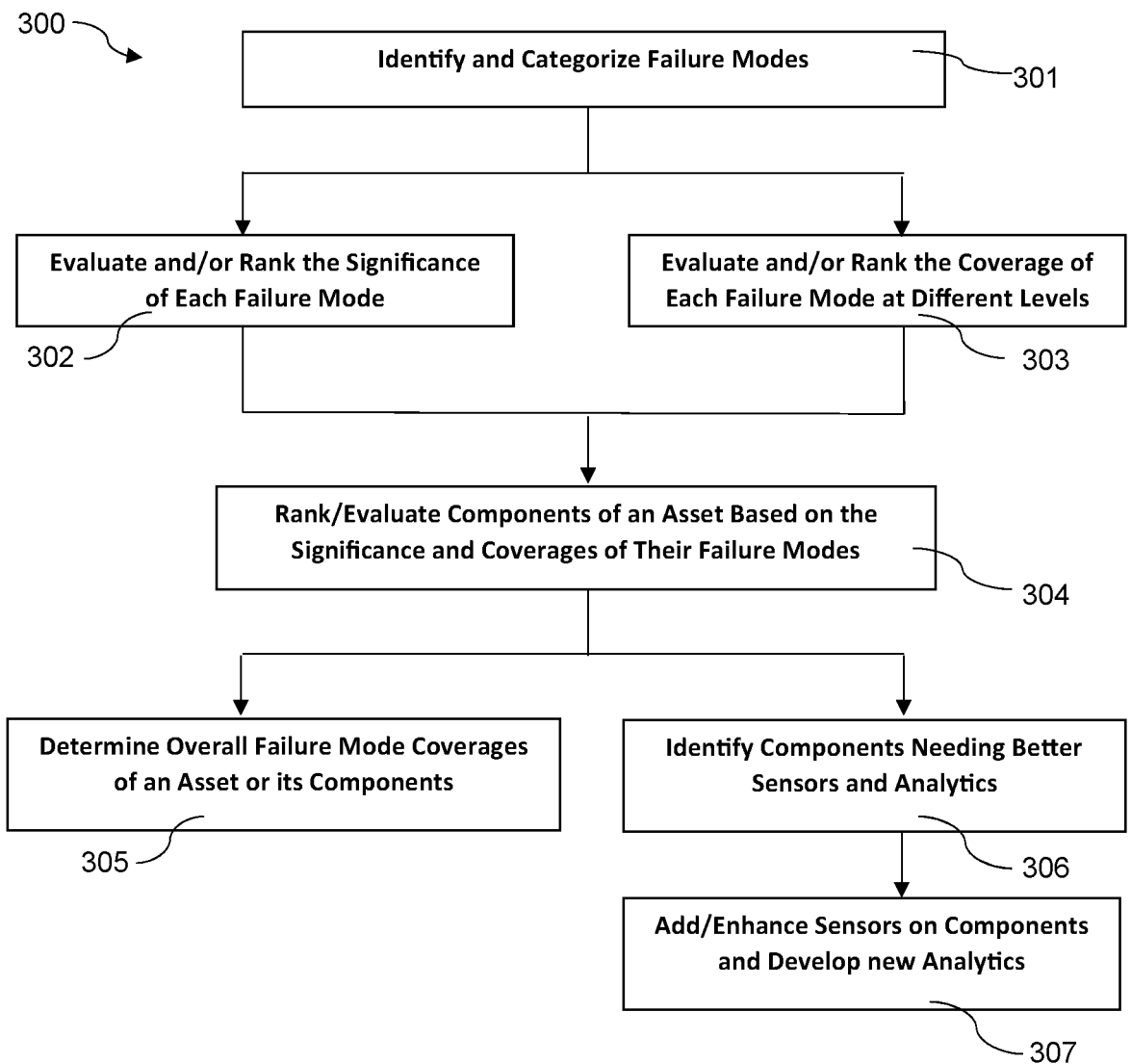
FIG. 3 shows an example workflow of evaluating and reducing outages in an asset through mapping analytical data of the asset to identified failure modes.

FIG. 3 shows an example workflow 300 of evaluating and reducing outages in an asset through mapping analytical data of the asset to identified failure modes.

In an example embodiment, during the operation of an asset, such as a combined cycle power plant, different kinds of failures may occur to many hardware, electrical, software and control components that make up the asset, and a failure of one component may be caused by many different reasons. For example, with respect to power plants, over 11000 failure modes are identified by the North American Electric Reliability Corporation (NERC) based on customer reported failures and reasons for failure. As a result, the large amount of failure modes may need to be identified and grouped into a reduce number of failure modes before being further analyzed.

In step 301 of the workflow 300, a manageable number of failure modes are identified and categorized from a large amount of failure modes in connection with an asset. In an example embodiment, the asset under evaluation is a combined cycle power plant, and failure modes related to the asset may be reported by customers, or recorded by system(s) monitoring the power plant. Moreover, the failure modes gathered and identified by the NERC may be used to identify and categorize failure modes associated with the power plant. For example, among the 11000 failure modes identified by the NERC, 250 failure modes may be identified as being associated with the power plant and/or its components. With respect to a single hardware component, 100 failure modes may be grouped together into one failure mode associated with the component. The identification and categorization of the failure modes may be conducted automatically based on predetermined rules input or programmed in advance. Alternatively, in certain example embodiments, the failure modes may be identified and grouped by power plant operators based on their experiences in the field.

The identified and categorized failure modes are then used to evaluate and reduce outages in the asset by leveraging analytics data generated for the asset. For each of the identified failure modes, the significance and detectability of the failure mode may be evaluated and ranked, as illustrated in steps 302 and 303 of FIG. 3. The steps 302 and 303 may be performed separately, or may be performed sequentially or simultaneously.

In step 302, the significance of each failure mode is evaluated and ranked by mapping analytical data of the asset to the failure modes identified in step 301. The significance of each failure mode is determined at least by the impact and/or cost caused by the specific failure. In an example embodiment, the significance of a failure mode associated with a power plant is measured by the unplanned downtime, the frequency of occurrence, and/or the cost of the outage. Normally, the longer the outage, the larger the impact.

Therefore, historical data, such as data about the frequency of occurrence of a failure mode, the unplanned downtime and/or the cost caused by the failure more, may be used to evaluate the significance of the failure mode. The historical data includes, but not limited to, data reported by customers or asset operators, data streams detected from assets, and/or analytical data generated by an APM system. An experienced operating engineer may evaluate the significance of a failure mode based on the relevant historical data, such as frequency of occurrence, unplanned downtime and/or cost, and based on his experiences in the field. In certain example embodiments, the rules or criteria used to determine the significance of certain failure modes based on relevant historical data may be input or programmed by an asset operator. Thus, through analyzing and processing the relevant historical data based on predefined criteria or rules, the significance of a failure mode may be determined automatically.

Moreover, failure modes associated with various asset components may be ranked or prioritized depending their significance. In view of the rankings of the failure modes associated with asset components, an asset owner or operator can easily tell which failure modes are more important than the others or which components are associated with more significant failures.

In step 303, the coverage of each failure mode is evaluated and/or ranked. The coverage of a failure mode represents the level of certainty in detecting the failure mode. For example, the coverage of a failure mode may represent how certain the failure mode can be detected, for example, by an APM system and/or operators. Historical data, such as data reported by customers, data streams received from asset sensors or the analytical data from an APM system, can be used to evaluate how certain a failure mode can be detected. In some example embodiments, the detectability or coverage of a failure mode can be determined based on information like the frequency of occurrence and/or the amount of unplanned downtime associated with the failure mode. The downtime metrics or other relevant information may not only be derived from analytics generated by an APM system associated with the asset, but also be reported by customers or asset operators.

The coverages of identified failure modes are categorized into particular groups, for example, 1) high failure mode coverage (e.g., for failure modes with high certainty of detection); 2) moderate failure mode coverage (e.g., for failure modes with moderate certainty of detection); and 3) low or none failure mode coverage (e.g., for failure modes with low certainty of detection). In an example embodiment, the failure modes of high coverages may have more than 80 percent of certainty in detection, the failure modes of moderate coverages may have 30 to 80 percent of certainty in detection, and the failure modes of low coverages may have less than 30 percent of certainty in detection. By evaluating and categorizing the coverages of failure modes associated with a specific component, it is clear to an asset owner or operator whether the failure modes of the component have higher coverages relative to the failure modes associated with other components.

Figure 8:
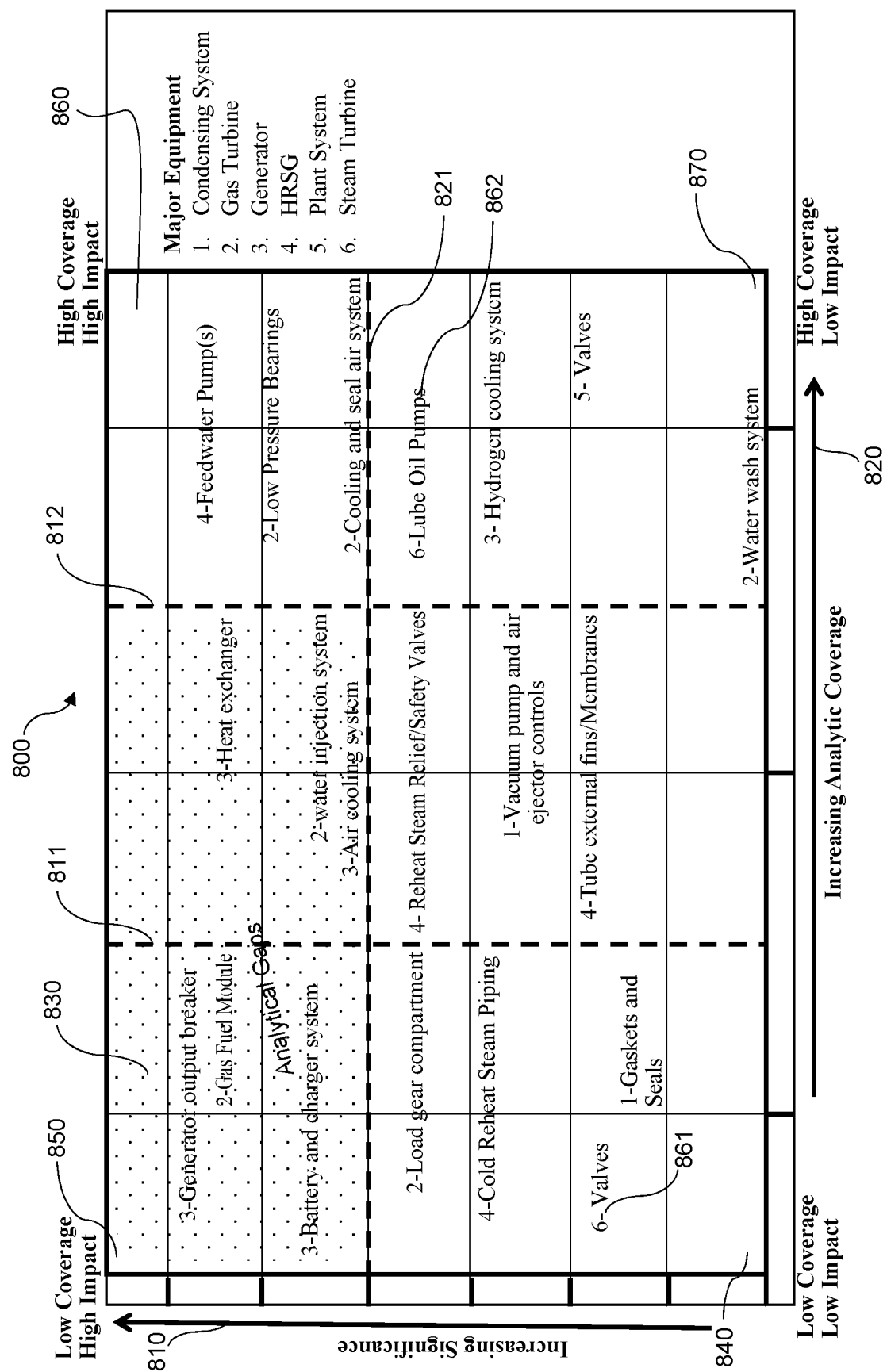
FIG. 8 shows an example report of the significance and analytical coverages of failure modes associated with components of a power plant at different levels.

In step 304, failure modes associated with components at different levels are ranked and evaluated based on both their significance and their coverages. In this way, the relative significance and detectability of failure modes associated with a particular component are clearly shown. For example, as shown in FIG. 8, the significance of failure modes associated with different components are ranked along one axis, and, in the meantime, the coverages of these failure modes are ranked along another axis. Further details of reporting relative significance and coverages of failure modes associated with different components are described in connection with FIGS. 8-10.

Figure 4:
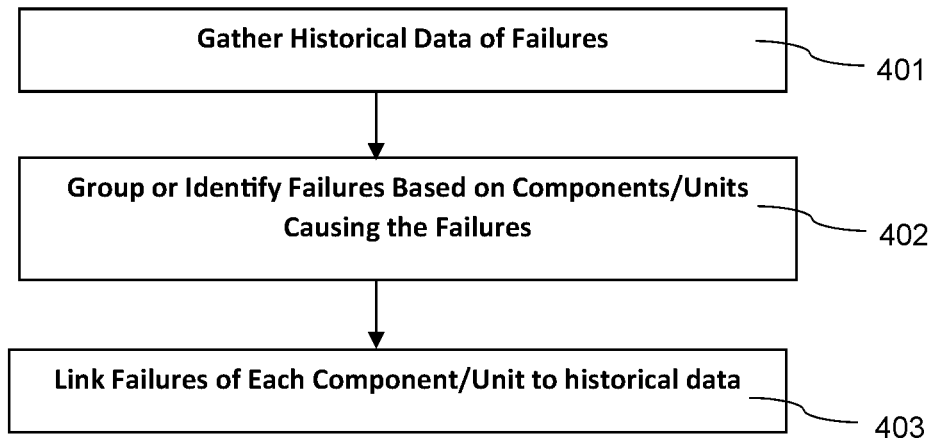
FIG. 4 shows a detailed workflow of identifying and categorizing failure modes.
Figure 5:
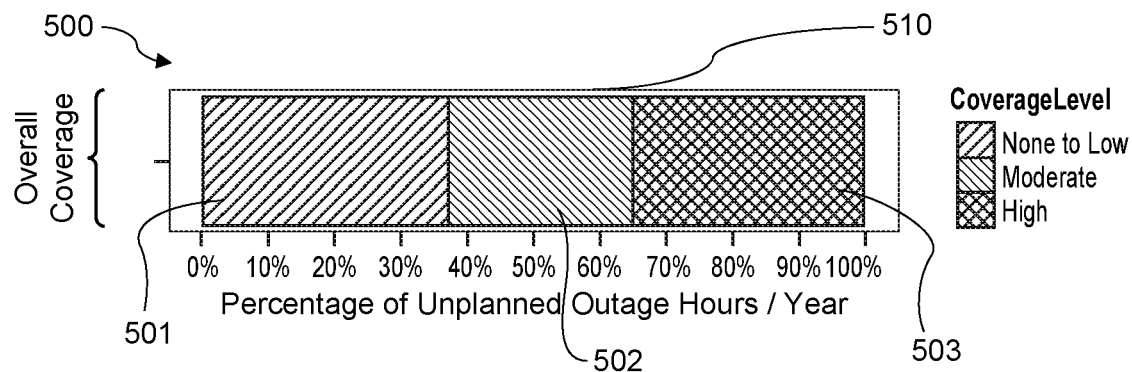
FIG. 5 shows an overall failure mode coverage diagram for an example power plant.
Figure 6:
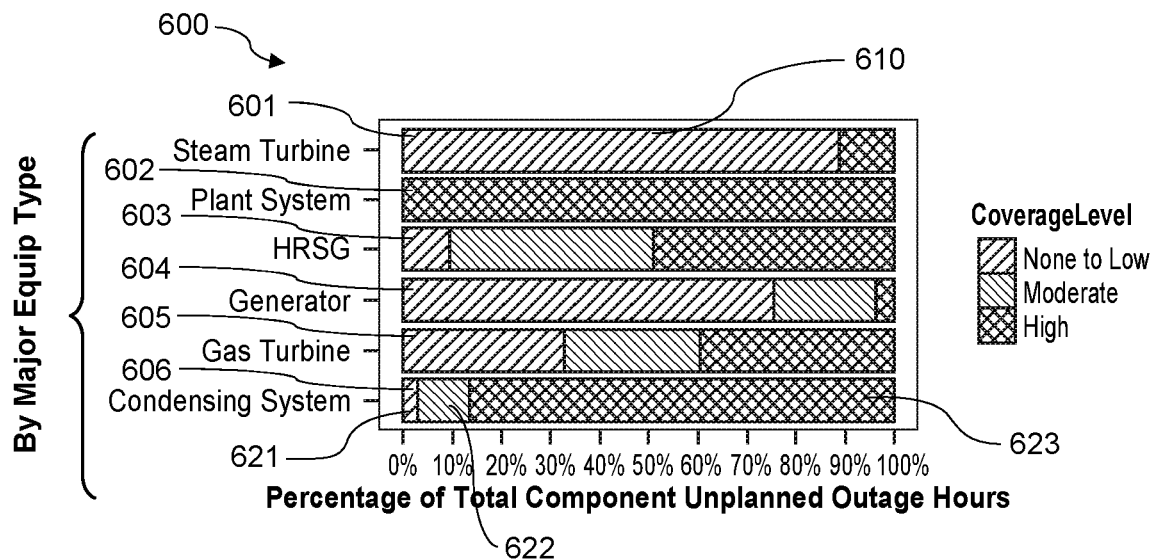
FIG. 6 shows an example failure mode coverage diagram for major components of an example power plant.

In step 305, failure modes associated with components at various levels are evaluated and aggregated to derive an average failure mode coverage of an asset (like a power plant), and/or an average failure mode coverage of a major component of the asset. As detailed later, FIGS. 4-6 illustrate the overall failure mode coverages of a combined cycle power plant, the failure mode coverages of major components of the power plant, and the failure mode coverages of components at unit level respectively. Importantly, a power plant owner may also be able to know the coverages of failure modes with high impact and cost. An asset owner may only require achieving high coverages for important failure modes, but not for all failure modes.

In step 306, components needing better sensors and analytics are identified based on the rankings derived in step 304. In particular, based upon the rankings of the significance and coverages of failure modes associated with various components, certain analytical gaps in reducing failures of an asset can be easily identified. In certain example embodiments, analytical gaps in reducing outages in an asset can be components having low failure mode coverages, or more particularly, components associated with important failure modes but having low failure mode coverages. Thus, components falling into these analytical gaps may be identified as components that need better sensors and/or more analytics compared to the other components.

The rankings of the significance and coverages of failure modes also provide a roadmap for an asset owner or operator as to how to maximize the performance of an asset like a power plant, as the asset owner will clearly know where and how to invest in developing strategic plans geared towards performance optimization. For example, as shown in step 307, new sensors may be added into components that are determined to fall into the analytical gaps of an asset. In addition, more analytics may be developed in connection with these components to better predict their failure modes. The rankings and evaluations thus help an asset owner in developing a strategic plan with respect to how and where to invest in order to maximize the performance of an asset.

FIG. 4 shows a detailed workflow of the step 301 in FIG. 3—identifying and categorizing failure modes.

In step 401, historical data regarding various failures of an asset are gathered. The failures of an asset may include failures of hardware, electrical, software and control components that make up the asset. The historical data includes but not limited to failures or failure reasons reported by customers, or data recorded by system(s) monitoring the asset. In certain example embodiments, the historical data may include failure modes identified by the NERC with respect to power plants.

In step 402, the gathered failure modes may then be grouped and/or identified based on components that make up the asset. A number of failure modes associated with a hardware component may be grouped together into a single failure mode. A group of failure modes associated with one component may also be identified as one failure mode. Therefore, a manageable number of failure modes can be identified from a large amount of failure modes. In an example embodiment, 250 failure modes are identified among 11000 failure modes gathered by the NERC.

In certain example embodiments, the gathered failure modes may be manually identified and grouped by an asset operator based on his/her experiences in the field. Alternatively, the identification and categorization of the failure modes may be conducted automatically based on predetermined rules input or programmed by experienced asset operators.

After that, in step 403, the reduced number of failure modes identified in step 402 are linked to relevant historical data. In other words, the historical data are mapped to the identified failure modes associated with different components to evaluate and rank these failure modes from different perspectives, such as their significance and detectability.

Figure 7:
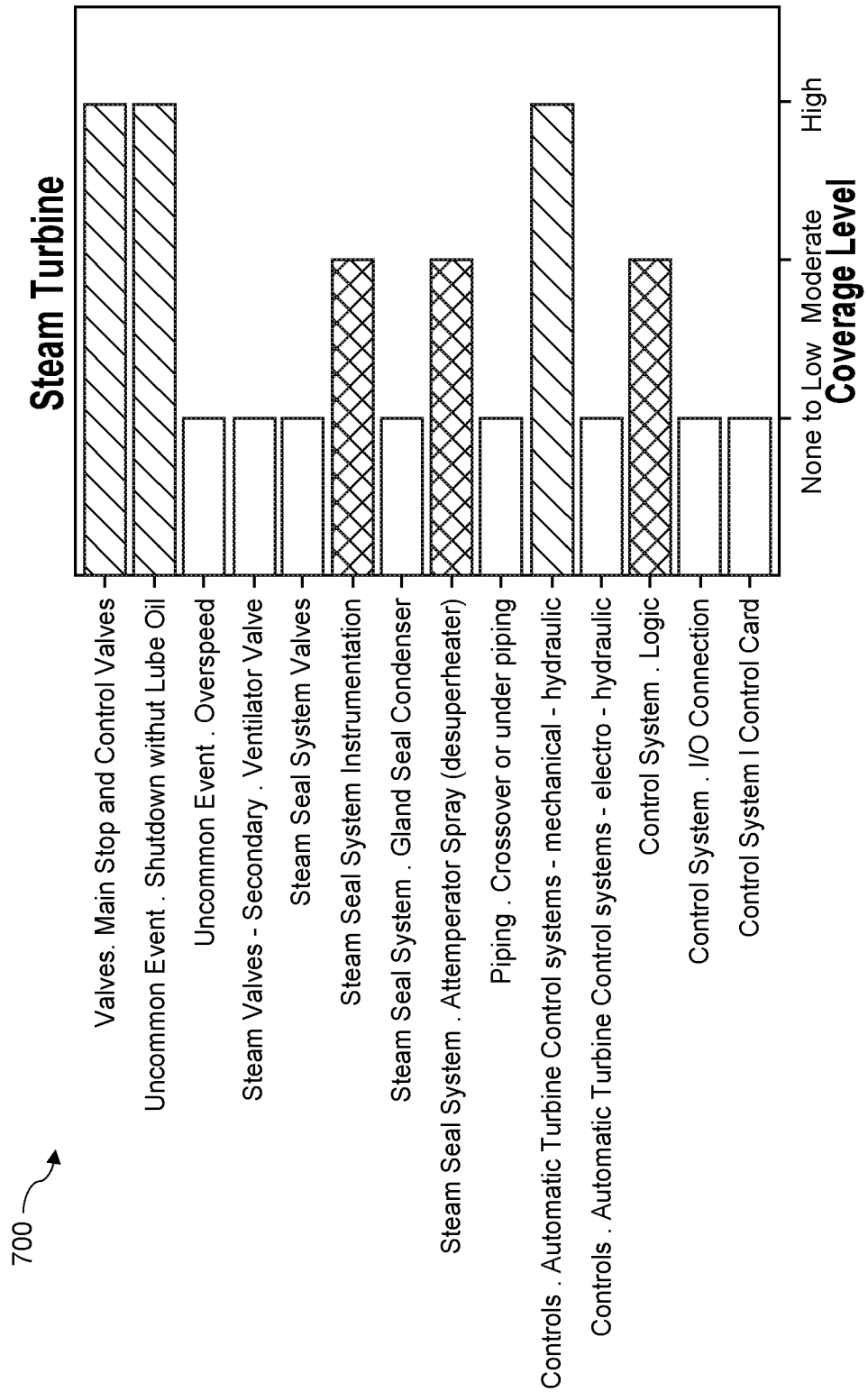
FIG. 7 shows an example failure mode coverage diagram for an example steam turbine at unit level.

Referring now to FIGS. 5-7, the overall failure mode coverages of an example power plant and its components are identified at different levels, for example, from system level to unit level.

FIG. 5 shows an overall failure mode coverage diagram 500 for a combined cycle power plant as a whole. As illustrated in this figure, depending on their coverage levels, failure modes of the power plant are categorized into three groups: 1) none-to-low coverage levels, 2) moderate coverage levels, and 3) high coverage levels. In particular, a bar 510 in FIG. 5 summarizes all of the failure modes of the power plant, and the bar 510 comprises three portions 501, 502 and 503 representing failure modes falling into the above-identified three groups respectively. The X axis of the coverage diagram 500 indicates the percentage of failure modes falling into each of the above-identified groups. FIG. 5 indicates that around 35% of failure modes of the power plant have high certainty of detection (as indicated by the 503 portion), around 28% of failure modes of the power plant have moderate certainty of detection (as indicated by the 502 portion), and around 37% of failure modes of the power plant have none to low certainty of detection (as indicated by the 501 portion). In other example embodiments, the overall failure mode coverages of an asset may be displayed in alternative manners, such as other types of graphs, charts, tables, etc.

FIG. 6 shows a failure mode coverage diagram 600 summarizing the coverages of the failure modes associated with each major component of an example power plant. The power plant comprises several major components, including, for example, a steam turbine, a plant system, a HRSG, a generator, a gas turbine, and a condensing system.

The horizontal axis of the coverage diagram 600 indicates the percentage of the failure modes falling into each of the above-identified coverage level groups. The failure mode coverage diagram 600 comprises multiple bars 601-606, each representing the failure mode coverages of one of the major components. The vertical axis of the coverage diagram 600 indicates that one of the bars 601-606 is associated with a specific major component. Particularly, the overall failure mode coverages of the steam turbine, plant system, HRSG, generator, gas turbine, and condensing system of the power plant are illustrated in the bars 601-606 respectively. For each of these major components, the coverages of their associated failure modes are categorized into at least one of the above-identified coverage level groups: none-to-low coverage levels, moderate coverage levels, and high coverage levels. For example, there may be many failure modes associated with the condensing system. The bar 606 representing the condensing system illustrates that around 3% of these associated failure modes have none to low coverages (as indicated in a 621 portion of the bar 606), around 86% of these associated failure modes have high coverages (as indicated in a 623 portion of the bar 606), and around 11% of these associated failure modes have moderate coverages (as indicated in a 622 portion of the bar 606).

More specifically, FIG. 7 shows an example failure mode coverage diagram 700 of a steam turbine at unit level. As one of the major components of a combined cycle power plant, the steam turbine comprises hardware, electrical, software and control components, such as, main stop and control valves, ventilator valves, a gland seal condenser, attemperator sprays, piping, automatic turbine control systems, I/O connections, and control cards, etc. Failure modes are identified to be associated with these components, and then the average coverage of these failure modes associated with each of these components is categorized based on the level of certainty in detecting the failure modes. In this figure, the average coverages of failure modes associated with a particular component are categorized into one of the three categories: a none-to-low coverage level, a moderate coverage level, and a high coverage level.

FIG. 7 illustrates that components or events associated with failure modes with high average coverages include: main stop and control valves, shutting down without lube oil, and the mechanical and hydraulic aspects of an automatic turbine control systems. It also illustrates that components associated with failure modes with moderate average coverages include: the instrumentation of a steam seal system, and the attemperator spray (desuperheater) of the steam seal system. Further, this figure shows that components or events associated with failure modes with none-to-low average coverages include: over speeding of the steam turbine, ventilator valves, valves of the steam seal system, a gland seal condenser of the steam seal system, piping (crossover or under piping), electro and hydraulic aspects of automatic turbine control systems, a I/O connection of a control system, and a control card of a control system.

In view of the above, failure modes are identified and associated with a combined cycle power plant and its components from system level to unit level, and the failure mode coverages of the power plant are determined at various levels. Therefore, a power plant owner knows not only the overall failure mode coverage of the power plant as a whole, but also the failure mode coverages of particular units.

As discussed above in connection with step 304 in FIG. 3, failure modes associated with different components at different levels are ranked and evaluated based on both their significance and coverages. The rankings of the significance and coverages of identified failure modes associated with various components of an asset may be used to generate graphical or textual reports indicating analytical gaps in reducing outages of the asset.

Referring now to FIG. 8, this figure shows an example report 800 with respect to the overall significance and detectability of failure modes associated with various components in a combined cycle power plant. In particular, the report 800 illustrates the rankings of failure modes associated with units of six major components: 1) a condensing system, 2) a gas turbine, 3) a generator, 4) a HRSG, 5) a plant system and 6) a steam turbine. As shown in FIG. 8, various components of the power plant are ranked along a vertical axis 810 depending on the overall significance of their associated failure modes, and, in the meantime, these components are ranked along a horizontal axis 820 depending on the overall coverage of their associated failure modes. For example, in FIG. 8, valves and lube oil pumps of the steam turbine are listed at positions 861 and 862 of the report 800 respectively based on the significance and analytical coverages of their associated failure modes.

Particularly, the overall significance of failure modes associated with various components are increasing along the vertical axis 810, while the overall analytical coverages of these failure modes are increasing along the horizontal axis 820 as well. As a result, a corner 840 at the left bottom of the report 800 lists components that are associated with failure modes having low impact and low analytical coverages, a corner 850 at left top of the report 800 lists components that are associated with failure modes having high impact and low analytical coverages, a corner 860 at the right top of the report 800 lists components that are associated with failure modes having high impact and high analytical coverages, and a corner 870 at the right bottom of the report 800 lists components that are associated with failure modes having low impact and high analytical coverages. Moreover, dotted lines 811, 812 and 821 are introduced into the report 800 to mark up regions with particular ranges of significance and analytical coverages.

Based upon the rankings of the significance and coverages of failure modes shown in the report 800, analytical gaps in reducing outages in the power plant or its components can be easily identified. In some example embodiments, the analytical gaps in reducing outages of the power plant can be components having low failure mode coverages, or components having important failure modes and low failure mode coverages. The analytical gaps in reducing outages of the power plant thus may be certain components that need better sensors and/or analytics. In FIG. 8, a dotted region 830 is marked by the dotted lines 812 and 821 to represent the identified analytical gaps in reducing outages in the power plant. The dotted region 830 lists certain components of the power plant, such as the generator output breaker of the generator, the gas fuel module of the gas turbine, the battery and charger system of the generator, the heat exchanger of the generator, the water injection system of the gas turbine, and the air cooling system of the generator, etc. Components listed in the dotted region 830 are components that are associated with failure modes having high significance but low analytical coverages, and hence they are identified as components that may need better sensors and/or analytics.

Figure 9:
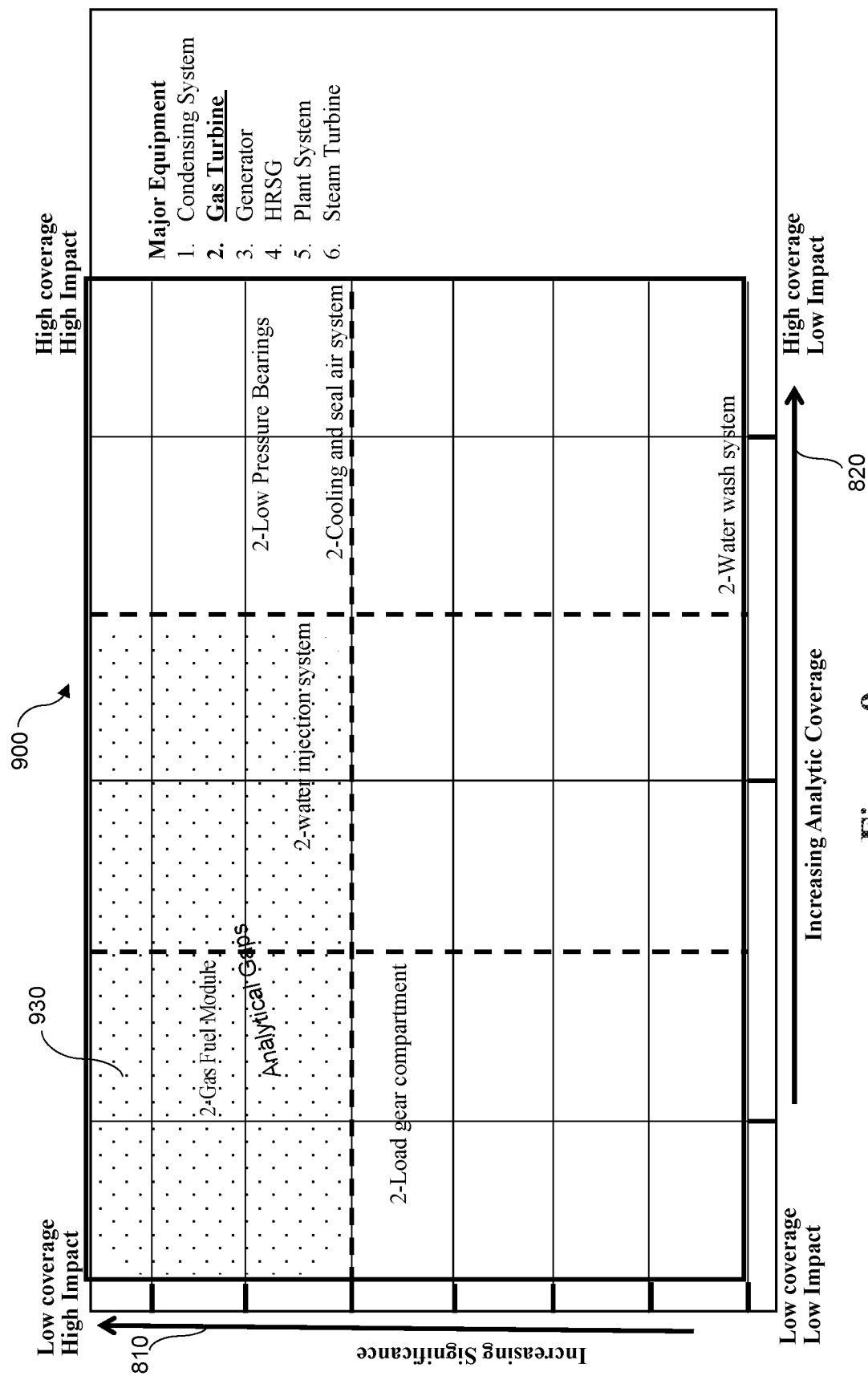
FIG. 9 shows an example report of the significance and analytical coverages of failure modes associated with a particular component of the power plant.

In reviewing a ranking report, an asset owner or operator may select to view only the rankings of failure modes in associated with a particular component or system. FIG. 9 shows an example report 900 of the significance and analytical coverages of failure modes associated with a particular component of the power plant—a gas turbine. In an example embodiment, after the asset owner or operator selects the "gas turbine" as the focus of reporting, the report 900 will list only units of the gas turbine, such as the gas fuel module, the water injection system, the lower pressure bearings, the cooling and seal air system, and the load gear compartment of the gas turbine. In these cases, only the failure modes associated with units of a selected component are evaluated and ranked depending on their significance and analytical coverages.

Similar to the report 800 in FIG. 8, the report 900 clearly illustrates the relative overall significance and relative overall coverage for each unit of the gas turbine. It illustrates that failure modes associated with the load gear compartment of the gas turbine have relatively low overall coverage and relatively moderate impact, failure modes associated with the water wash system of the gas turbine have relatively high overall coverage and relatively low impact, and failure modes associated with the low pressure bearings and the cooling and seal air system of the gas turbine have relatively high overall coverage and relatively high impact. Importantly, the report 900 also shows that the gas fuel module and the water injection system of the gas turbine fall into a dotted region 930, which lists components associated with high impact and low coverage failure modes. The units listed in the dotted region 930 thus may be identified as components that need additional sensors and/or analytics.

In certain example embodiments, users may select particular groups of failure modes and their associated components to be ranked based on their specific concerns and interests. For example, a user may choose to review only components associated with top 20 important failure modes, components associated with failure modes with analytical coverages less than 30%, or components associated with failure modes with relatively high significance. In particular, a power plant operator of a steam turbine may select to review only failure modes that are associated with the steam turbine and have low overall coverage and high significance. Therefore, based upon the report 900, an asset owner can know where and how to invest in developing strategic plans geared towards performance optimization.

Figure 10:
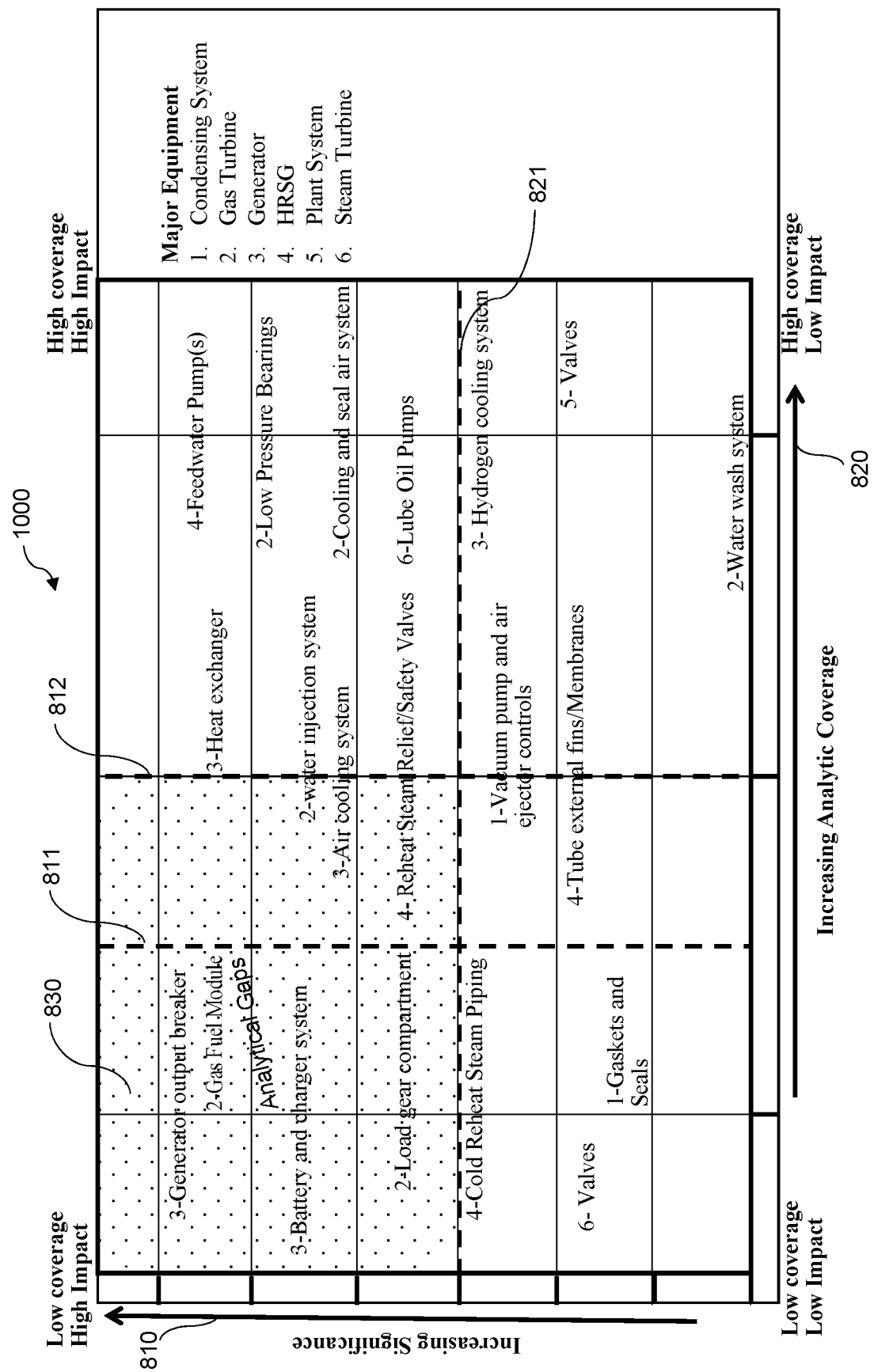
FIG. 10 shows an example report of the significance and analytical coverages of failure modes associated with various components of the power plant.

Moreover, users may not only filter out components of particular equipment that they are not interested in, but also configure the particular display of the output reports. In certain example embodiments, users are allowed to define the scope of a region representing the analytical gaps in reducing failures of an asset, to define the order of display along an axis, or to define the display manner or color patterns of the output reports. FIG. 10 shows another example report 1000 for the failure modes associated with various components of the power plant. In the report 1000, different from the report 800 in FIG. 8, the positions of the dotted line 812 and 821 are modified in order to re-define the scope of the dotted region 830 representing the analytical gaps in reducing outages in the power plant.

In other example embodiments, users may change the order of display along one or more axis(es). In FIGS. 8-10, the significance of failure modes associated with various components are increasing along the vertical axis 810, while the overall analytical coverages of these failure modes are increasing along the horizontal axis 820. Alternatively, an asset operator may re-configure the output reports to make the significance of failure modes decrease along the vertical axis 810, and/or make the analytical coverages of these failure modes increase along the horizontal axis 820.

While the example embodiments disclosed herein are related to the management of power plants, it is to be understood that the invention is not to be limited to power plants, but is intended to cover the management of other kinds of assets or systems, such as manufacturing equipment in a factory, equipment in a commercial building, or fleets of a shipping company.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims. The word "or" means either or both unless indicated otherwise in this document.

What is claimed is:

1. A method of monitoring an industrial system, the method comprising:
    selecting failure modes of the industrial system into a group of selected failure modes;
    correlating each of the selected failure modes to an asset component of a plurality of asset components of the industrial system, wherein the industrial system includes a plurality of asset components, the correlating defining a significance and detectability of failure modes associated with the plurality of asset components;
    ranking by severity each of the selected failure modes, wherein the severity is indicative of an effect each selected failure mode has on operation of the industrial system;
    for each selected failure mode, determining whether an analytic monitors operation of the asset component correlated to the selected failure mode;
    for each selected failure mode, ranking by an ability of the analytic monitoring the asset component;
    in response, at least, to the ranking by severity and the ranking by the ability of the analytic monitoring the asset component, determining an analytical coverage of the industrial system, the determining defining analytical gaps, wherein the analytical gaps include asset components having relatively low failure mode coverages, wherein the failure mode coverages represent a level of certainty in detecting the failure modes; and
    generating, in response to determining the analytical coverage of the industrial system, a report of the failure modes for developing strategic plans for performance optimization.

2. The method of claim 1 wherein the analytical coverage is expressed as a percentage of coverage of the plurality of asset components in the industrial system.

3. The method of claim 1 wherein the analytical coverage is expressed as a listing of the plurality of asset components based on the ranking by the ability of the analytic to monitor the asset component.

4. The method of claim 1 wherein the analytical coverage identifies failure modes which are not reliably detected by at least one analytic.

5. The method of claim 1 wherein the industrial system is a power generation plant and at least one analytic monitors sensors associated with at least one of a steam turbine, gas turbine and electrical generator.

6. The method of claim 1 wherein at least one analytic includes sensors within the industrial system which monitor the plurality of asset components of the industrial system.

7. The method of claim 1 wherein the analytical coverage identifies failure modes which are not detected by at least one analytic.

8. An asset performance management system including a cloud based computer system and local computer systems monitoring power generation plants, wherein the asset management system executes instructions and accesses data to:
    select failure modes of the industrial system into a group of selected failure modes,
    correlate each of the selected failure modes to an asset component of a plurality of asset components, of the industrial system, wherein the industrial system includes a plurality of asset components, the correlating defining a significance and detectability of failure modes associated with the plurality of asset components;
    rank by severity each of the selected failure modes, wherein the severity is indicative of an effect each selected failure mode has on operation of the industrial system;
    for each selected failure mode, determine whether an analytic monitors operation of the asset component correlated to the selected failure mode;
    for each selected failure mode, rank by an ability of the analytic monitoring the asset component;
    in response, at least, to the ranking by severity and the ranking by the ability of the analytic monitoring the asset component, determine an analytical coverage of the industrial system, the determining defining analytical gaps, wherein the analytical gaps include asset components having low failure mode coverages, wherein the failure mode coverages represent a level of certainty in detecting the failure modes; and generate, in response to determining the analytical coverage of the industrial system, a report of the analytical coverage and the failure modes for developing strategic plans for performance optimization.

9. The system of claim 8 wherein the report includes a description of the analytical coverage expressed as a percentage of coverage of the plurality of asset components in the industrial system.

10. The system of claim 8 wherein the report includes a description of the analytical coverage expressed as a listing of the plurality of asset components based on a ranking of abilities of a plurality of analytics to monitor each of the plurality of asset components.

11. The system of claim 8 wherein the report includes a description of the analytical coverage and identifies selected failure modes which are not reliably detected by at least one analytic.

12. The system of claim 8 wherein at least one analytic monitors sensors associated with at least one of a steam turbine, gas turbine and electrical generator at the power generation plants.

13. The system of claim 8 wherein the report identifies the selected failure modes which are not detected by at least one analytic.

* * * * *